United States Patent [19]

Bleakley

[11] 4,261,231
[45] Apr. 14, 1981

[54] INSULATION STRIPPING APPARATUS

[75] Inventor: Thomas C. Bleakley, Acton, Mass.

[73] Assignee: Raytheon Company, Lexington, Mass.

[21] Appl. No.: 109,372

[22] Filed: Jan. 3, 1980

Related U.S. Application Data

[63] Continuation of Ser. No. 934,304, Aug. 17, 1978, abandoned, which is a continuation of Ser. No. 799,904, May 23, 1977, abandoned.

[51] Int. Cl.³ .................................................. H02G 1/12
[52] U.S. Cl. ........................................................ 81/9.51
[58] Field of Search .......................................... 81/9.51

[56] References Cited

U.S. PATENT DOCUMENTS

| | | | |
|---|---|---|---|
| 2,789,452 | 4/1957 | Miller | 81/9.51 X |
| 2,834,859 | 5/1958 | Alexander et al. | 81/9.51 X |
| 3,636,799 | 1/1972 | Weitala et al. | 81/9.51 |
| 3,748,932 | 7/1973 | Neiman et al. | 81/9.51 |
| 3,765,276 | 10/1973 | Pollitt | 81/9.51 |
| 3,922,934 | 12/1975 | Hiatt | 81/9.51 X |
| 3,973,600 | 8/1976 | Choromokos | 81/9.51 X |
| 4,019,409 | 4/1977 | McKeever | 81/9.51 |

Primary Examiner—James G. Smith
Attorney, Agent, or Firm—Philip J. McFarland; Joseph D. Pannone

[57] ABSTRACT

Apparatus is disclosed to decompose, by heating, parts of the insulation on an insulated wire or cable. The disclosed apparatus includes, in combination with conventional feed and cutting mechanisms, a stripping station wherein electrical heating elements are disposed to encompass each part of the insulation to be stripped and to effect the desired decomposition. The electrical heating elements are mounted in frictional contact with movable mounting means in such a fashion that low electrical resistance contacts are made, yet replacement of the heating elements is facilitated.

1 Claim, 2 Drawing Figures

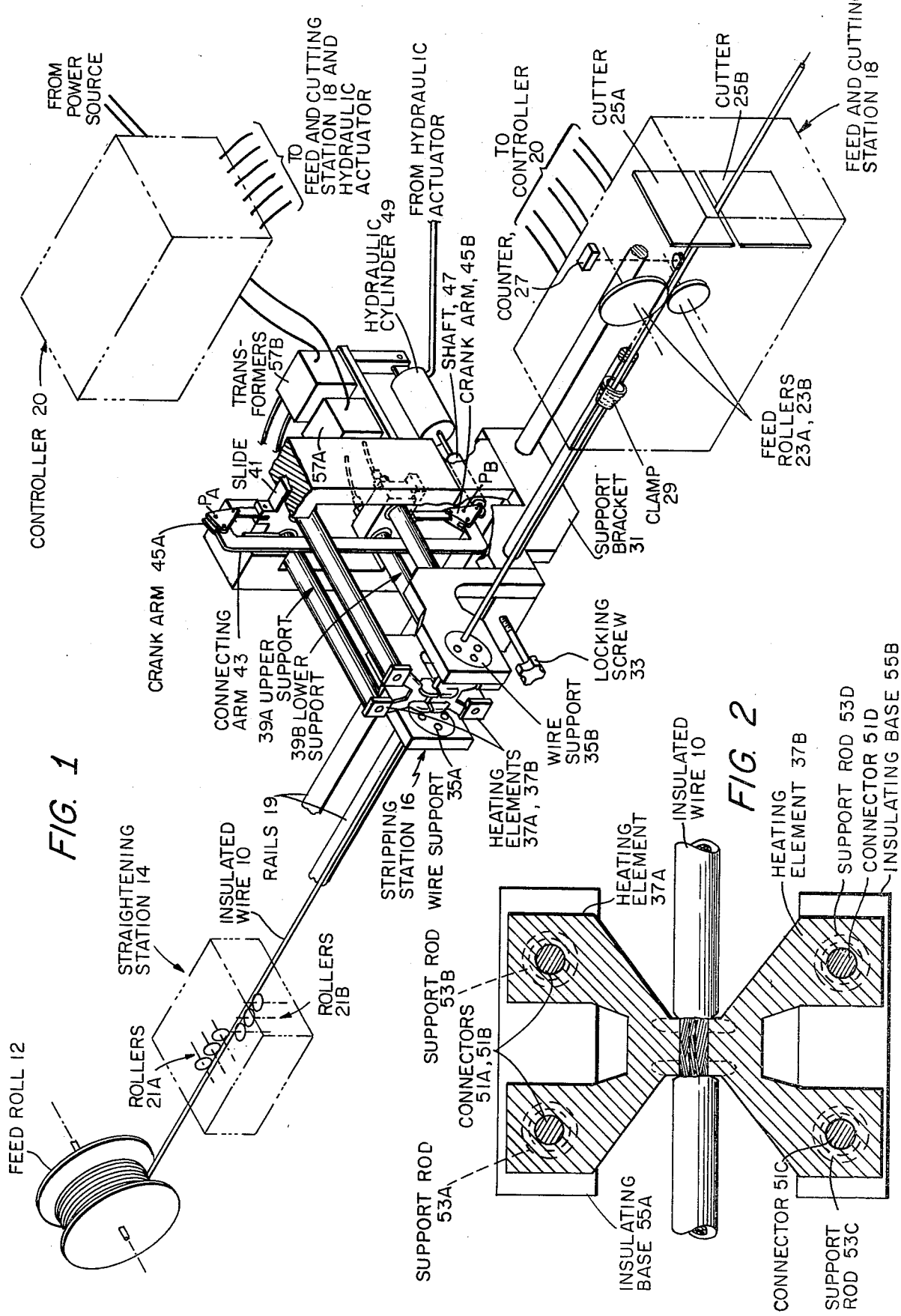

INSULATION STRIPPING APPARATUS

CROSS-REFERENCE TO RELATED CASES

This is a continuation of application Ser. No. 934,304, filed Aug. 17, 1978 which in turn is a continuation of application Ser. No. 799,904 filed May 23, 1977 both now abandoned.

BACKGROUND OF THE INVENTION

This invention pertains generally to machinery for removing insulation from electrical wires or cables and particularly to machinery of such type which incorporates heating and cutting means to effect such end.

In the production of electrical apparatus, it is often necessary to provide means for making an electrical contact at a preselected point, or different preselected points, of the run of an insulated wire or cable. When the electrical apparatus being produced is of any degree of complexity, it is quite common for different types and sizes of insulated wire or cable to which such electrical contacts are to be made to be used.

One known way to effect an electrical contact along the run of an insulated wire or cable is to crimp an appropriately shaped connector at each desired point. Such a connector includes a portion which, in the process of crimping, cuts through the insulation to effect the desired electrical connection. The use of such appropriately shaped connectors offers a convenient and inexpensive way to make electrical connections to insulated wire or cable. However, in applications wherein the resistance of such connections must remain low for long periods of time under adverse environments, the use of crimped connectors cannot be tolerated.

A more certain known way to effect an electrical connection at a preseelected point, or at preselected points, along the run of an insulated wire or cable is to remove a portion of the insulation so that a more permanent electrical joint may be made (as by soldering or welding) between the so-exposed wire or shield and other elements of the electrical apparatus. In one known way of stripping insulation along the run of a wire or cable, a thermal scoring tool (meaning a tool having a narrow heated working surface shaped to fit around the periphery of the wire or cable being processed) is used. The ends of the portion of the run of wire or cable from which the insulation is to be removed are successively positioned in the thermal scoring tool and small rings of the insulation are melted and removed. The insulation on the run between the small rings is then cut and peeled off to expose the desired lenght of wire or shield.

Obviously, the just-outlined method of exposing a preselected portion of the wire or shield underlying a run of insulated wire or cable is not one which may be easily and inexpensively applied in the manufacture of electrical apparatus of extremely high quality. That is to say, the requisite peeling operation must be carried out with skill and care to avoid damage to the wire or shield being exposed.

SUMMARY OF THE INVENTION

It is, therefore, a primary object of this invention to provide an improved thermal stripper in manufacturing machinery, such combination being adapted to remove preselected portions of the run of an insulated wire or cable without any danger of damage to the remaining parts of such wire or cable.

The foregoing and other objects of this invention are provided generally by providing an insulation stripping machine comprising: (a) a spool on which insulated wire or cable to be stripped is wound; (b) feed means for unwinding a length of the insulated wire or cable on the spool to position a preselected portion of such length of wire or cable at a stripping station; (c) a stripping station including means for positioning the preselected portion of the length of wire between a pair of shaped electrical heating elements and control means for moving such elements into contact with the insulation to be removed, passing a sufficient electrical current through such heating elements to decompose the underlying insulation and then to retract such elements; and (d) cutting means for severing the length of wire or cable from the roll of wire preparatory to repeating the operation. In a preferred embodiment of the invention the stripping station comprises at least: (a) a pair of cooperating electrical heating elements shaped to encompass the preselected portion of the wire or cable; and (b) control means for varying, in accordance with the length of the preselected portion and the particular insulating material to be removed, the amount of heat applied by the electrical heating elements to decompose or degrade the underlying insulation for removal.

BREIF DESCRIPTION OF THE DRAWINGS

For a more complete understanding of this invention, reference is now made to the accompanying description of the attached drawing, in which FIG. 1 is an isometric view, greatly simplified the better to show the relationship of the subassemblies making up a machine according to this invention; and FIG. 2 is a cross-sectional view of the electrical heating elements in a strippng station according to this invention.

DESCRIPTION OF THE PREFERRED EMBODIMENT

Before referring to the FIGURES, it will be noted that, for expository reasons and clarity of illustration, only the contemplated stripping station has been shown in detail. It is felt that details of the subassemblies shown in phantom, the supporting structures for the various subassemblies and the switching arrangement for controlling operation are so well known in the art thata detailed explanation of such is not necessary to impart an understanding of the invention to a man of ordinary skill.

With the foregoing in mind it may be seen in FIG. 1 that the free end of an insulated wire (or cable) 10 stored on a feed roll 12, is passed successively through a straightening station 14, a stripping station 16 and a feed and cutting station 18. The three just-mentioned stations are mounted on a pair of rails 19 so that the run of the insulated wire 10 through such stations is straight. The operation of the latter two stations is synchronized by appropriate control signals from a controller 20.

The straightening station 14 is conventional, comprising sets of rollers (exemplary sets identified by the numerals 21A, 21B being shown) to remove any kinks or bends in the insulated wire 10 as it is removed from the feed roll 12.

The feed and cutting station 18 also is conventional. Thus, the major elements within the feed and cutting station 18 are: (a) a pair of feed rollers 23A, 23B; (b) a pair of cutters 25A, 25B; (c) a counter 27; and (d) a clamp 29. The latter is made up of a pair of pivoted cams (not shown) which allow movement of the free end of the insulated wire 10 toward the feed and cutting station 18 and which prevent movement of the free end of the insulated wire 10 toward the stripping station 16. It will now be appreciated that the feed rollers 23A, 23B and the cutters 25A, 25B in the feed and cutting station 18 may be actuated periodically by any conventional driving mechanism (not shown) controlled by signals from the controller 20 and the counter 27 to remove a predetermined length of insulated wire 10 from the feed roll 12 and to sever such a length from the free end of the insulated wire 10.

Referring now to FIG. 2 as well as FIG. 1, the details of the stripping station 16 will now be described. Thus, in FIG. 1, it may be seen that a support bracket 31 is slidably mounted on the rails 19. A locking screw 33 is threaded through the support bracket 31 to bear against one of the rails 19, thereby to allow the stripping station 16 to be fixed in any desired position along the length of the rails 19.

A pair of standards (not numbered) are formed, as shown, in the support bracket 31 to mount a pair of wire supports 35A, 35B disposed to hold the insulated wire 10 between a pair of heating elements 37A, 37B. The wire supports 35A, 35B preferably are formed plates with holes (not numbered) of different sizes spaced along a circular path, such plates being pivotably mounted on the standards. It will be appreciated then that (if an appropriate detent mechanism, not shown, is provided) appropriately sized holes in the wire supports 35A, 35B may be selected to fit around any of a number of sizes of insulated wire and to maintain the wire in position between the standards. A pair of heating elements 37A, 37B is movably supported between the standards by, respectively, an upper support 39A and a similar lower support 39B. The upper support 39A and the lower support 39B in turn are mounted in a slide 41 which is an integral part of the support bracket 31. Motion of the heating elements 37A, 37B toward and away from the insulated wire 10 is effected by actuating a lever arrangement. Thus, a connecting arm 43 is pivotably mounted to a crank arm 45A and a crank arm 45B. The latter arms in turn are pivoted on the slide 41 at the points designated $P_A$ and $P_B$ and are pivotably connected, as shown, to elements (insulating bases 55A, 55B) mounted in the slide 41. A shaft 47 which is an extension of the shaft in a hydraulic cylinder 49 is pivotably mounted to the crank arm 45B. It will be appreciated from the foregoing that when the shaft 47 is caused to move, ultimately the heating elements 37A, 37B are caused to be clamped down on the insulated wire 10 or to be retracted.

It will be obvious that provision must be made to connect the heating elements 37A, 37B to a power source (not shown). At the same time, it is highly desirable that the heating elements 37A, 37B be easily emplaced or disconnected so that insulated wires with different diameters may be accommodated or the amount of insulation to be removed may be changed. In the disclosed embodiment, therefore, the heating elements 37A, 37B are frictionally held in the ends of support rods 53A, 53B, 53C, 53D by connectors 51A, 51B, 51C, 51D. Each one of the latter has a cylindrical body with a cylindrical projection as indicated in FIG. 2. Each cylindrical projection is proportioned to fit in a mating hole (not numbered) in the corresponding heating element 37A, 37B. In view of the disparity in the electrical conductivities of the connectors 51A, 51B, 51C, 51D (here brass) and the heating elements 37A, 37B (here INCONEL 600, although any material used to form electrical heating elements may be used) it is preferred to weld the parts together. The cylindrical body of each one of the connectors 51A, 51B, 51C, 51D is frictionally engaged in a corresponding hole (not numbered) in the end of a corresponding one of four support rods 53A, 53B, 53C, 53D as indicated in FIG. 2. It will be evident, then, that as indicated in FIG. 1, the connectors 51A, 51B, 51C, 51D may be proportioned to allow the heating elements 37A, 37B to be positioned on either side of an insulated wire 10 with a low resistancy contact between the heating elements 37A, 37B and the support rods 53A, 53B, 53C, 53D (here brass). The far end of each of the latter rods is affixed to a corresponding one of a pair of insulating bases 55A, 55B as indicated in FIG. 1. Each one of the latter elements in turn is shaped to move in the slide 41 and to provide connection between each supporting rod 53A, 53B, 53C, 53D and a terminal (not numbered). The secondary windings of transformers 57A, 57B are connected to the just-mentioned terminals. The primaries of the transformers 57A, 57B, then are actuated, through the controller 20, from a power source (not shown) when the heating elements 37A, 37B are clamped down on the insulated wire 10.

It will now be apparent to one of skill in the art that the just-described stripping station 16 may be modified easily by replacing the illustrated heating elements with heating elements which extend for longer or shorter distances along the insulated wire 10 to change the amount of insulation to be removed. It will also be apparent that the length of time the heating elements are clamped around the insulated wire being treated and the amount of electrical current applied will be a function of the amount of insulation to be removed and the material of such insulation. It will also be apparent that more than the single illustrated stripping station 16 may be positioned to allow insulation to be removed simultaneously from more than one portion of the insulated wire. Still further, it will also be apparent that the combination of each heating element 37a, 37b and connectors 51a, 51b, 51c, 51d may be replaced by a unitary cast member fabricated completely from an electrically resistive material such as INCONEL 600 so that the resulting element may be fitted into the ends of the support rods 53a, 53b, 53c, 53d. Finally, it will also be apparent that the frictional contact between the connectors and the support rods may be supplemented by the use of said screws passing through each support rod to engage the connectors. It is felt, therefore, that this invention should not be restricted to its disclosed embodiment but rather should be limited only by the spirit and scope of the appended claims.

What is claimed is:

1. Apparatus for removing a selected length of the insulation from along the run of a roll of insulated wire to leave undisturbed insulation on either side of such length and to expose a corresponding length of underlying wire, such corresponding length being greater than the diameter of the insulated wire, such apparatus comprising:
   (a) a stripping station including:
      (i) a first and a second electrical heating element, each one having a length substantially equal to the selected length of insulation to be removed and a cross-sectional shape substantially corresponding to one-half of the cross-sectional shape of the insulated wire;

(ii) movable mounting means frictionally engaging the first and the second electrical heating elements to position such elements on opposite halves of the insulated wire around the selected length of the insulation to be removed and for providing electrical connections to such elements;

(iii) means for periodically actuating the mounting means to cause the first and the second electrical heating elements to engage opposite halves of each selected length of the insulation to be removed for a selected period of time and then to retract the first and second heating elements; and (iv) means, operative during the selected period of time, for applying electrical power through the mounting means to the first and the second heating elements to decompose completely the insulation to be removed to expose a corresponding length of underlying wire with undisturbed insulation on either side of such length; and (b) means periodically operable to unroll predetermined lengths of the insulated wire from the roll thereof successively to position each selected length of the insulation to be removed between the first and the second electrical heating element.

* * * * *